US009472172B1

(12) United States Patent
Nassab

(10) Patent No.: US 9,472,172 B1
(45) Date of Patent: Oct. 18, 2016

(54) GUITAR PICK DISPENSER

(71) Applicant: Paul Nassab, Sarasota, FL (US)

(72) Inventor: Paul Nassab, Sarasota, FL (US)

( * ) Notice: Subject to any disclaimer, the term of this patent is extended or adjusted under 35 U.S.C. 154(b) by 0 days.

(21) Appl. No.: 15/138,304

(22) Filed: Apr. 26, 2016

(51) Int. Cl.
*G10D 3/16* (2006.01)
*F16M 13/02* (2006.01)
*B65D 83/08* (2006.01)

(52) U.S. Cl.
CPC ........... *G10D 3/163* (2013.01); *B65D 83/0817* (2013.01); *F16M 13/022* (2013.01)

(58) Field of Classification Search
CPC .............. G10D 3/163; B65D 83/0817; B65D 83/0823; B65D 83/0829; B65D 83/0835; B65D 83/12; F16M 13/022
USPC ........................................................ 211/59.3
See application file for complete search history.

(56) References Cited

U.S. PATENT DOCUMENTS 355,207 A * 12/1886 Reinfeld ................ A45C 11/18 206/39.5
631,729 A * 8/1899 Smith .................... G10D 3/163 84/329
806,985 A * 12/1905 Mallory ................. A45C 11/18 206/39.5
1,244,338 A * 10/1917 Johnson ................. B65D 83/10 221/232
3,395,958 A 8/1968 Hospes
4,135,431 A * 1/1979 Ferguson ............... G10D 3/163 206/314
4,465,208 A 8/1984 Buban et al.
4,467,693 A 8/1984 Nasfell, Jr.
4,805,331 A * 2/1989 Boggess ............. G09F 15/0087 211/59.2
4,953,746 A * 9/1990 Andriash ........... B65D 83/0817 221/35
5,231,238 A 7/1993 Adams
5,275,306 A 1/1994 Demoss
5,566,857 A * 10/1996 Rothman ........... B65D 83/0418 221/229
5,651,468 A 7/1997 Irizarry
5,837,913 A 11/1998 Newman
5,847,299 A 12/1998 Zovko, Jr. et al.
6,215,052 B1 4/2001 Giddens et al.
6,601,813 B1 * 8/2003 Kager .................... A45D 20/12 248/288.31
7,337,918 B2 * 3/2008 Fowler ............... B65D 83/0829 221/232
7,626,103 B1 12/2009 Phillips

* cited by examiner

*Primary Examiner* — Korie H Chan
(74) *Attorney, Agent, or Firm* — Patterson Intellectual Property Law, P.C.; Gary L. Montle

(57) ABSTRACT

A guitar pick dispenser may include a dispenser body. The dispenser body may include a bottom and a side wall attached to the bottom. The sidewall may define an opening opposite the bottom. A false bottom may be connected to the bottom by a resilient member. The resilient member may be configured to bias the false bottom toward the opening. A guitar pick retainer may be slidably disposed on the dispenser body. The guitar pick retainer may be further configured to partially cover the opening.

19 Claims, 5 Drawing Sheets

GUITAR PICK DISPENSER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

Musicians playing guitar on stage typically prefer to have multiple guitar picks nearby. If a particular pick is dropped, the musician may simply grab a replacement pick as opposed to locating and retrieving the dropped pick. The musician may keep the spare picks in his pocket or on a nearby platform. Some guitar pick holders include a rail that may be mounted to a microphone stand. The rail may hold the picks between two projections. At least one pick may be mounted to the microphone stand and project therefrom in such configurations. This method of holding picks, however, has a limit as to how many picks may be retained on the stand. The limit is the practical length of the rail mounted to the stand. Also, no two guitar picks are located at the same height on the stand. These varying locations make it difficult for a musician to locate a respective pick without checking to see where it is prior to grabbing the pick.

BRIEF SUMMARY

The present disclosure relates generally to a guitar pick dispenser for holding guitar picks. The guitar pick dispenser may include a dispenser body. The dispenser body may include a bottom and a side wall attached thereto. The sidewall may define an opening opposite the bottom. A false bottom may be connected to the bottom by a resilient member. The resilient member may be configured to bias the false bottom toward the opening. A guitar pick retainer may be slidably disposed on the dispenser body. The guitar pick retainer may be configured to partially cover the opening.

In some embodiments, the guitar pick dispenser may further include a mounting clip. The mounting lip may be disposed on the dispenser body. The mounting clip may also be configured to attach the guitar pick dispenser to a mounting body.

In one embodiment, the mounting clip may define a channel. The channel may have a perimeter configured to partially receive the mounting body.

In another embodiment, the perimeter of the mounting clip may include opposing resilient flanges. The resilient flanges may slidably receive the mounting body into the channel.

Some embodiments may include the mounting clip integrally formed with the dispenser body.

Other embodiments may include the mounting clip being adjustable relative to the dispenser body.

In one embodiment, the mounting clip may be hingedly connected to the dispenser body.

In still another embodiment, the mounting clip may be rotatably connected to the dispenser body.

In yet another embodiment, the mounting clip may be connected to the dispenser body with a ball and socket joint.

Another embodiment of a guitar pick dispenser may include the dispenser body further including a window defined in the side wall. The window may be configured to display the level of the false bottom relative to the bottom of the dispenser body.

Some embodiments may include the guitar pick retainer including an arcuate retainer groove. The arcuate retainer groove may correspond to an arcuate wall protrusion on the dispenser body.

Yet another embodiment of a guitar pick dispenser may include a plurality of guitar pick retainers. Each guitar pick retainer may be configured to correspond to a respective type of guitar pick.

Still another embodiment of a guitar pick dispenser may include each guitar pick retainer including a visual indication of a corresponding guitar pick trait.

In one embodiment, each of the plurality of guitar pick retainers includes a similar arcuate retainer groove that corresponds to an arcuate wall protrusion on the dispenser body.

In a further embodiment, each guitar pick retainer may include a recess defined in the guitar pick retainer configured to be located between the guitar pick retainer and the dispenser body. The recess may allow for a single one of the guitar picks to pass therethrough.

In a still further embodiment, each guitar pick retainer may include a recess of a different size. Each guitar pick retainer may then correspond to the guitar picks of a respective thickness.

In yet a further embodiment, the guitar pick trait may include the thickness of a type of the corresponding guitar picks.

DETAILED DESCRIPTION

Figure 1:
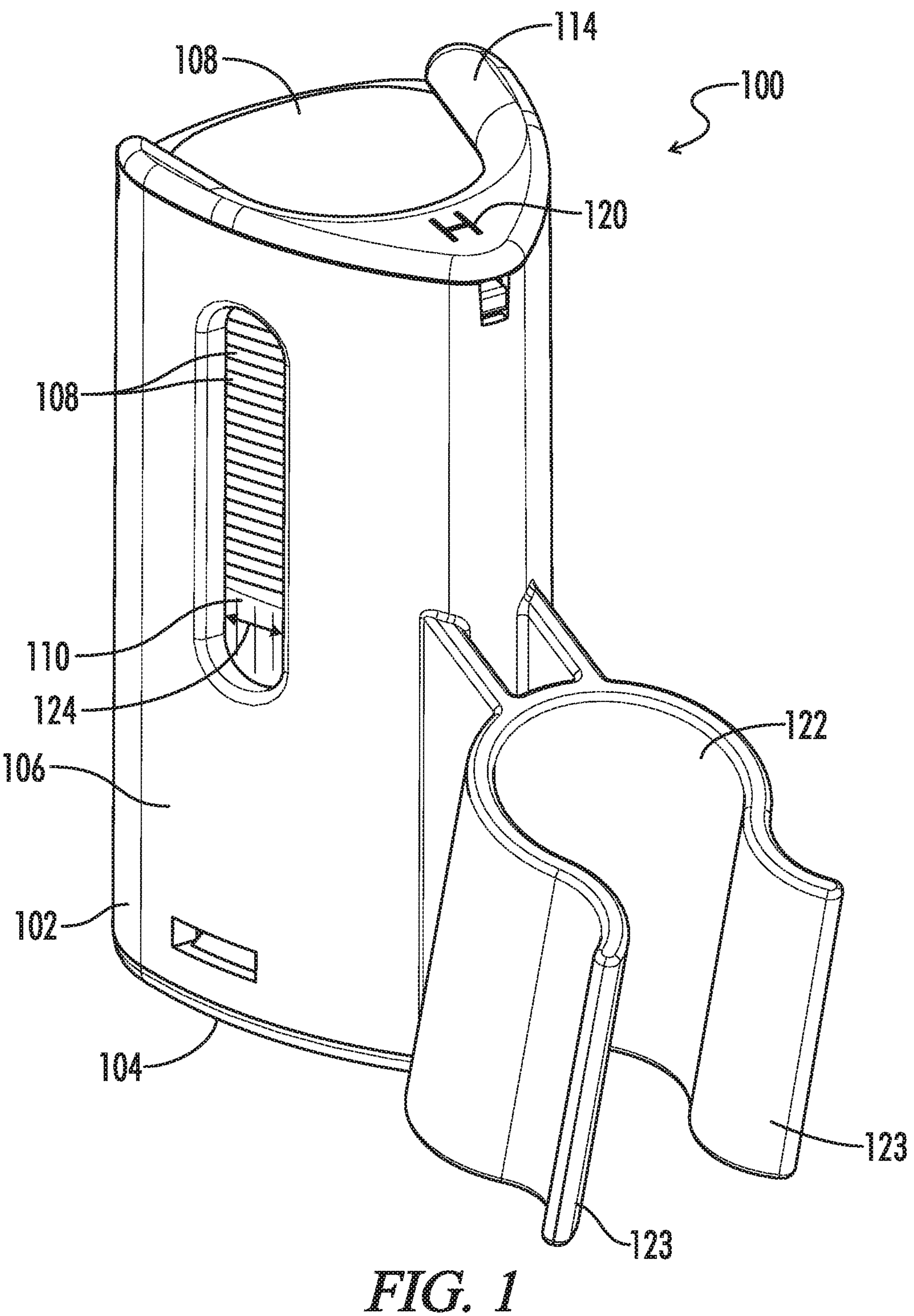
FIG. 1 is a top perspective view of an embodiment of a guitar pick dispenser.
Figure 2:
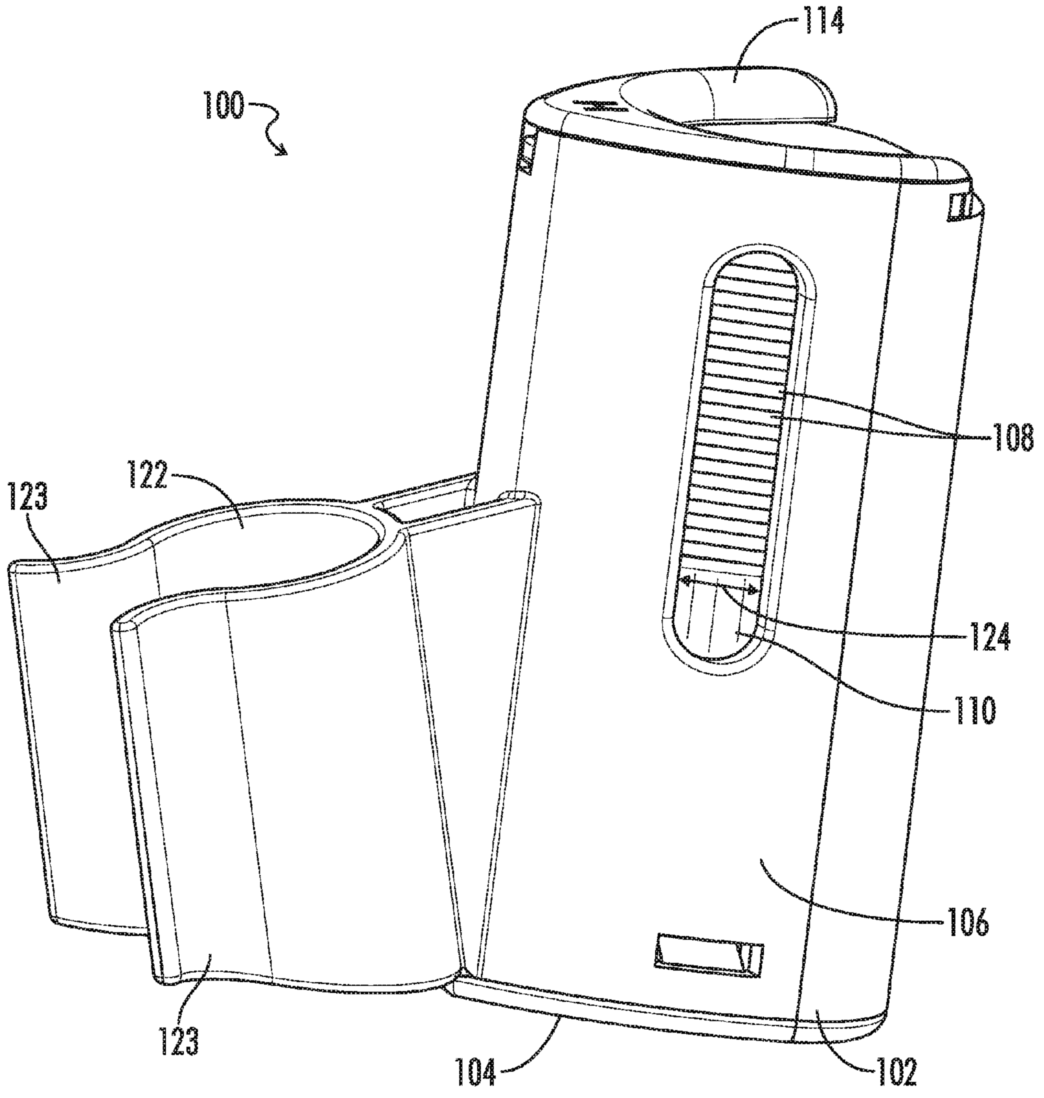
FIG. 2 is a side perspective view of the guitar pick dispenser of FIG. 1.
Figure 3:
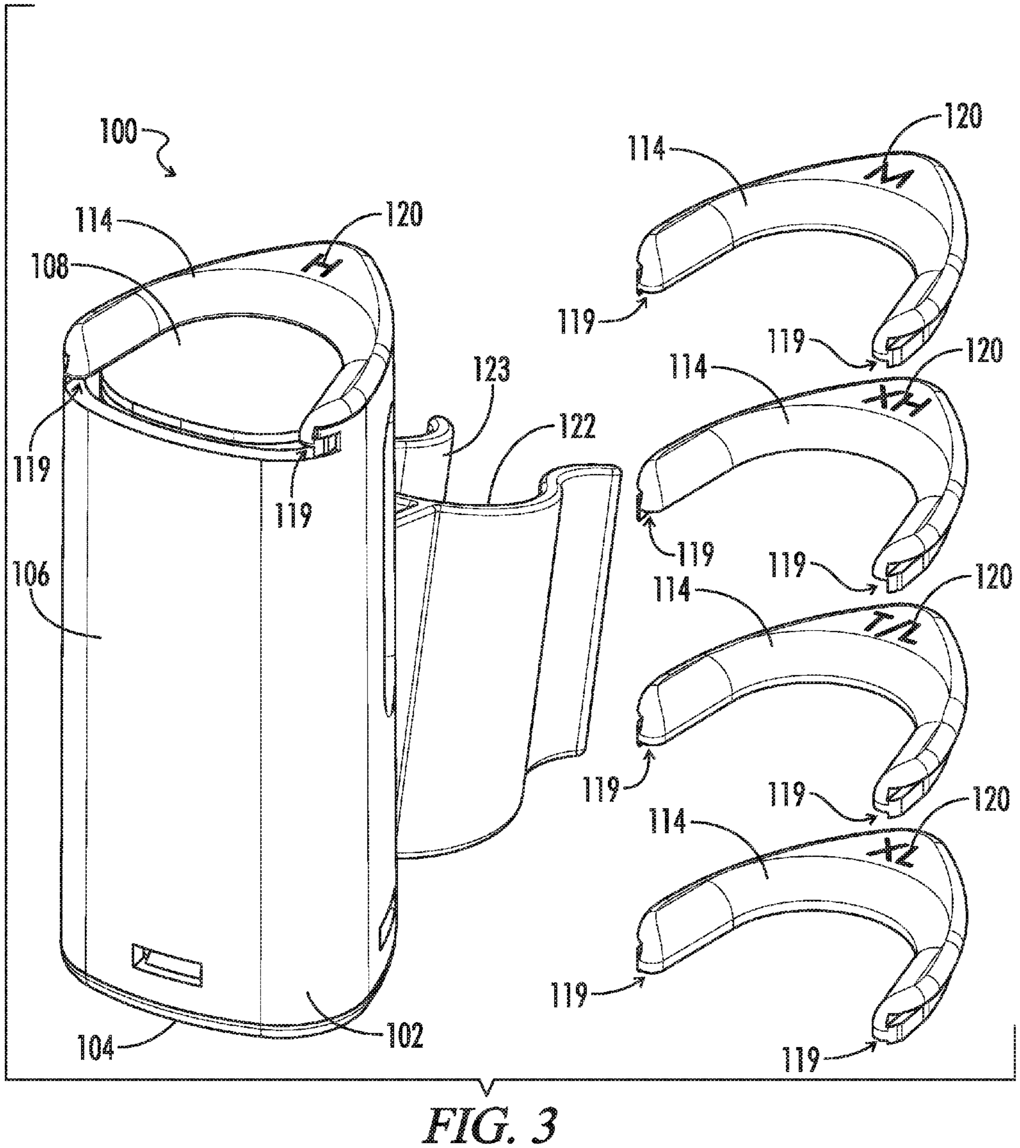
FIG. 3 is a top perspective view of the guitar pick dispenser of FIG. 1 and corresponding guitar pick retainers.

The present disclosure relates generally to a guitar pick dispenser 100. The guitar pick dispenser 100 may include a dispenser body 102. The dispenser body 102 may be made of any appropriate material including, but not limited to, polymers, metals, composites, and the like. The dispenser body 102 may include a bottom 104 and a sidewall 106 attached to the bottom. The sidewall 106 may define an opening opposite the bottom 104. The opening may be configured to receive a plurality of guitar picks 108. The guitar picks 108 may be stacked and placed in the opening.

A false bottom 110 may be disposed in the opening of the dispenser body 102 and connected to the bottom 104. In some embodiments, the false bottom 110 may be connected to the bottom 104 of the dispenser body 102 by a resilient member 112. In one embodiment, the resilient member 112 may include a spring. The resilient member 112 may be held in place by any appropriate means including, but not limited to, the bottom 104 of the dispenser body 102 and the false bottom 110 including retaining portions to contain the resilient member. Alternatively or additionally, the resilient member 112 may be held in place by one or more fasteners, pegs, grooves, and the like. The resilient member 112 may be configured to bias the false bottom 110 of the dispenser body 102 toward the opening opposite the bottom 104 of the dispenser body. As such, any guitar picks 108 disposed in the opening of the dispenser body 102 may rest on the surface of the false bottom 110 and be biased toward the opening by the resilient member 112. One embodiment may include the false bottom 110 including a shape and/or thickness that contacts the bottom 104 of the dispenser body 102 when the false bottom is pressed downward a threshold distance. The false bottom 110 may include this feature in order to prevent excessive compressive force being delivered to the resilient member 112. The guitar pick dispenser 100 may not, therefore, be easily over-filled with guitar picks 108. The guitar pick dispenser 100 may be configured to hold any number of guitar picks 108. In some embodiments, the guitar pick dispenser 100 may hold 5, 10, 15, 20, 50, or any other number of guitar picks 108.

A guitar pick retainer 114 may be slidably disposed on the dispenser body 102. The guitar pick retainer 114 may be configured to partially cover the opening in order to retain the guitar picks 108 in the dispenser body 102 against the force of the resilient member 112. The guitar pick retainer 114 may include a retainer groove 116 for receiving a corresponding wall protrusion 118 on the sidewall 106 of the dispenser body 102. The retainer groove 116 may be an arcuate retainer groove in some embodiments. The guitar pick retainer 114 may be slid into place over the opening of the dispenser body 102 such that the retainer groove 116 receives the wall protrusion 118. In some embodiments, the arcuate retainer groove 116 may be received in an arcuate wall protrusion 118. Each guitar pick retainer 114 may include rounded edges and may also include a sloped inner surface so as to direct a user's finger when a user attempts to engage the guitar pick 108 on the top of the guitar pick dispenser 100. When attached to the dispenser body 102, the guitar pick retainer 114 may allow for a spacing between the dispenser body and guitar pick retainer that is approximately equal to the thickness of a single guitar pick 108. This way, only a single guitar pick 108 may be removed at a time. The guitar pick retainer 114 may be removed and replaced with other guitar pick retainers.

Each guitar pick retainer 114 may be of varying size, shape, color, surface indicia, materials, and the like. In one embodiment, a set of guitar pick retainers 114 may include varying colors and surface indicia 120 so as to indicate the type of guitar pick 108 contained within the guitar pick dispenser 100. In one exemplary embodiment, the surface indicia 120 is a number corresponding to the thickness of the guitar picks 108 contained in the guitar pick dispenser 100. The guitar picks 108 may vary in size, shape, material, or thickness. Each guitar pick retainer 114, therefore, may allow for different respective spacing between the particular guitar pick retainer and the dispenser body 102 that corresponds with the approximate thickness of a single guitar pick 108 of the type indicated by the surface indicia 120 on the guitar pick retainer. In this manner, only a single guitar pick 108 may be removed from the guitar pick dispenser 100 at a time regardless of the thickness of the guitar picks placed in the guitar pick dispenser.

Some embodiments of the guitar pick dispenser 100 may include a mounting clip 122 disposed on the dispenser body 102. The mounting clip 122 may be configured to attach the guitar pick dispenser 100 to a mounting body. In one embodiment, the mounting clip 122 is configured to attach the guitar pick dispenser 100 to a microphone stand. The mounting clip 122 may be any appropriate clip or retaining mechanism. The mounting clip 122 may define a channel having a perimeter configured to partially receive the mounting body. The mounting clip 122 may be resilient such that introduction or removal of the microphone stand in the mounting clip may require a threshold force. In one example, the perimeter of the mounting clip 122 may include opposing resilient flanges 123 to slidably receive the mounting body into the channel. The mounting clip 122 may be integrally formed with the dispenser body 102 or may be a separate part from the dispenser body. The mounting clip 122 may also be made of a single part or multiple parts. The mounting clip 122 may be, in non-limiting examples, hingedly or rotatably adjustable relative to the dispenser body 102. Embodiments of the mounting clip 122 may include one or more hinge mechanisms, a ball and socket joint, resilient members, fasteners, and the like. In one embodiment, the mounting clip 122 may be angled from the dispenser body 102 such that the dispenser body is angled toward a user when the mounting clip is engaging a microphone stand.

In an exemplary embodiment, the dispenser body 102 may further comprise a window 124 defined in the sidewall 106. The window 124 may be of any appropriate shape and size so as to allow visual confirmation of the presence or absence of guitar picks 108 in the guitar pick dispenser 100. In some embodiments, the window 124 extends along a majority of the dispenser body 102 on at least one side. A user may look through the window 124 to quickly determine an estimation of how many guitar picks 108 remain in the guitar pick dispenser 100. The window 124 may be one or more holes. Alternatively, the window 124 may include a translucent or transparent material.

The present disclosure may also relate to a method of using a guitar pick dispenser 100. A user may load guitar picks 108 into the guitar pick dispenser 100 by placing each guitar pick at the opening and sliding it under the guitar pick retainer 114 if it is already attached to the dispenser body 102. While sliding the guitar pick 108 under the guitar pick retainer 114, the user must press the guitar pick downward against the resistance of the resilient member. Once the guitar pick 108 has been fully inserted under the guitar pick retainer 114, a user may then repeat the process with a new guitar pick until a sufficient number of guitar picks are loaded into the guitar pick dispenser 100.

Alternatively, a user may remove the guitar pick retainer 114 from the dispenser body 102 prior to loading the guitar picks 108. A user may remove the guitar pick retainer 114 from the dispenser body 102 by sliding the guitar pick retainer until the retainer groove 116 of the guitar pick retainer 114 is no longer interacting with the wall protrusion 118 of the sidewall 106. A user may then place a desired stack of guitar picks 108 in the opening of the dispenser body 102 onto the false bottom 110 against the resistance of the resilient member 112. A user may next replace the appropriate guitar pick retainer 114 (including the correct surface indicia 120) while holding the guitar picks 108 down against the force from the resilient member 112.

Using either guitar pick 108 loading method described above, a user may fully or partially load the guitar pick dispenser 100. Once a user is satisfied with the quantity of guitar picks 108 loaded into the guitar pick dispenser 100, the user may then proceed to mount the guitar pick dispenser to a mounting body, such as the vertical pole of a microphone stand. A user may engage the microphone stand with the mounting clip 122 of the guitar pick dispenser 100.

Once the guitar pick dispenser 100 is loaded and mounted, a user may retrieve a guitar pick 108 from the guitar pick dispenser by placing a finger on the exposed portion of the top guitar pick in the guitar pick dispenser. A user may then slide the guitar pick 108 out of the guitar pick dispenser 100 by moving the user's finger toward him in a linear rubbing motion. A user may need to apply a slight downward pressure against the guitar pick 108 (and, therefore, the resilient member 112) in order to remove the guitar pick. Alternatively, a user may only need to pull the guitar pick 108 out of the guitar pick dispenser 100 as described without a downward force.

Figure 4:
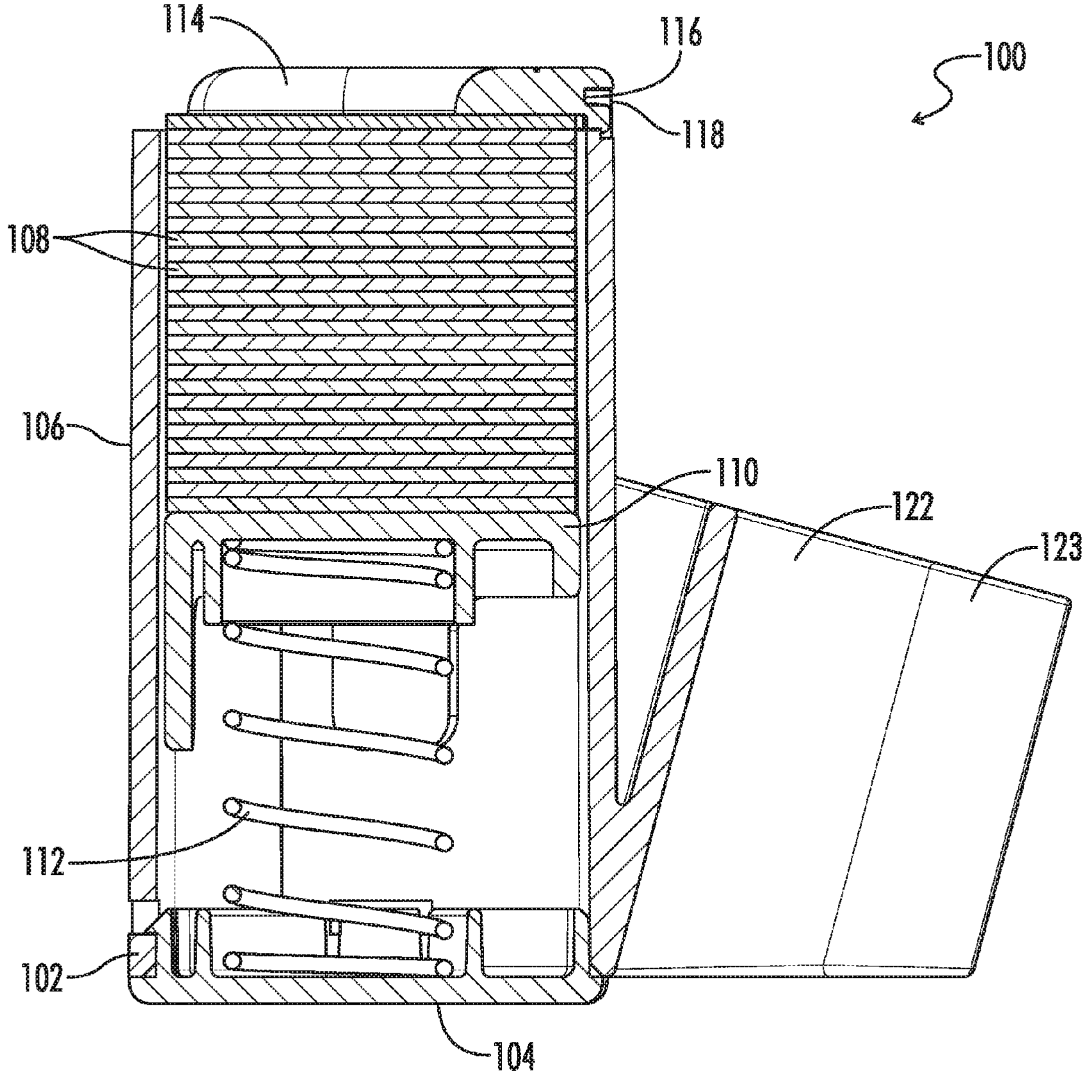
FIG. 4 is a cross-sectional view of the guitar pick dispenser of FIG. 1.
Figure 5:
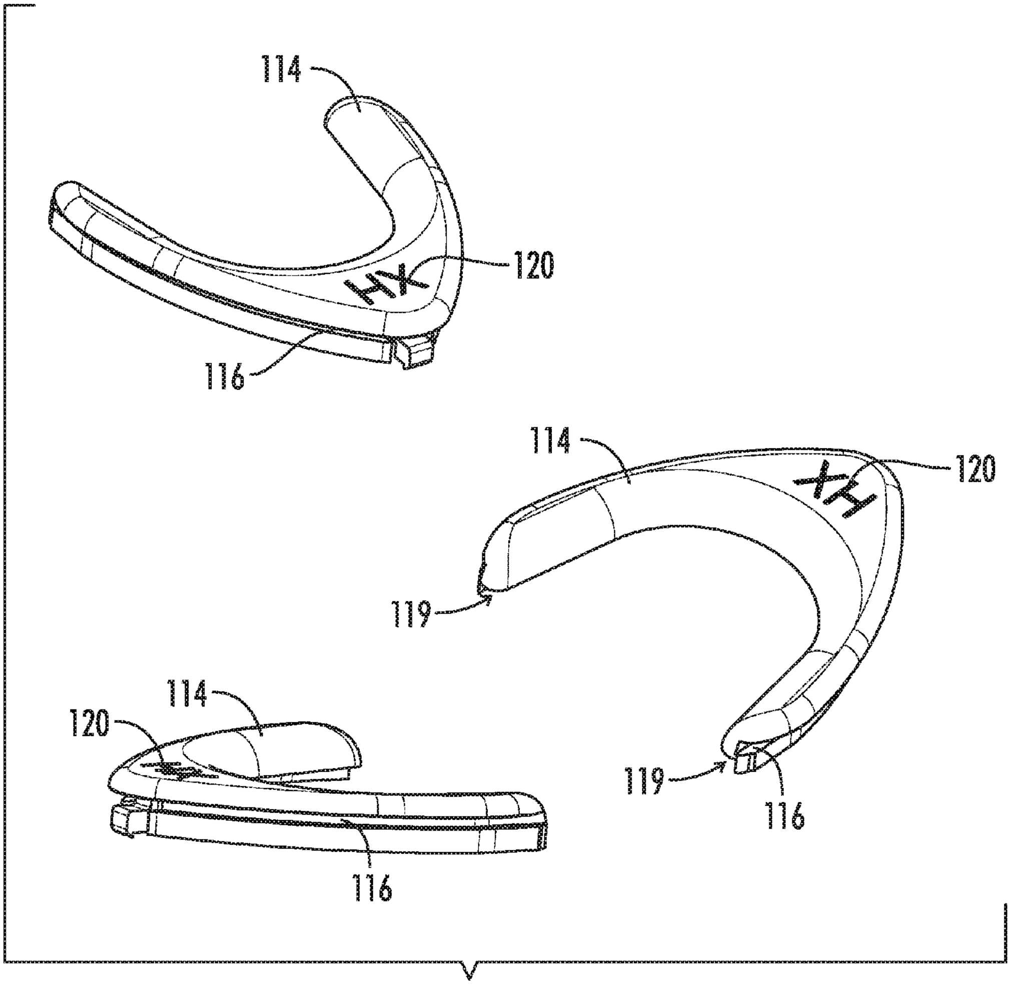
FIG. 5 is three perspective views of a guitar pick retainer of FIG. 3.

One embodiment of the guitar pick dispenser 100 may include a dispenser body 102 including a longitudinal bore defined therein (shown in FIG. 4). The guitar pick dispenser 100 may also include a pick receiver platform 110 slidably received in the longitudinal bore. A pick retainer 114 may be mounted on the dispenser body 102. The pick retainer 114 may be configured to retain the guitar pick 108 in the guitar pick dispenser 100 and allow access to at least a portion of the guitar pick. A resilient member 112 may also be disposed in the longitudinal bore. The resilient member 112 may be configured to bias the pick receiver platform 110 toward the pick retainer 114.

Thus, although there have been described particular embodiments of the present invention of a new and useful "Guitar Pick Dispenser", it is not intended that such references be construed as limitations upon the scope of this disclosure except as set forth in the following claims.

What is claimed is:

1. A guitar pick dispenser for holding guitar picks, the guitar pick dispenser comprising:

a dispenser body including a bottom and a side wall attached thereto, the sidewall defining an opening opposite the bottom;

a false bottom connected to the bottom by a resilient member, the resilient member configured to bias the false bottom toward the opening; and a guitar pick retainer slidably disposed on the dispenser body, the guitar pick retainer configured to partially cover the opening, wherein there are a plurality of guitar pick retainers provided, each guitar pick retainer configured to correspond to a respective type of guitar pick, wherein each guitar pick retainer includes a visual indication of a corresponding guitar pick trait.

2. The guitar pick dispenser of claim 1, further comprising:

a mounting clip disposed on the dispenser body, the mounting clip configured to attach the guitar pick dispenser to a mounting body.

3. The guitar pick dispenser of claim 2, wherein:

the mounting clip defines a channel having a perimeter configured to partially receive the mounting body.

4. The guitar pick dispenser of claim 3, wherein:

the perimeter of the mounting clip includes opposing resilient flanges to slidably receive the mounting body into the channel.

5. The guitar pick dispenser of claim 2, wherein:

the mounting clip is integrally formed with the dispenser body.

6. The guitar pick dispenser of claim 1, wherein:

the dispenser body further comprises a window defined in the side wall, the window configured to display a level of the false bottom relative to the bottom of the dispenser body.

7. The guitar pick dispenser of claim 1, wherein:

the guitar pick retainer includes an arcuate retainer groove corresponding to an arcuate wall protrusion on the dispenser body.

8. The guitar pick dispenser of claim 1, wherein:

each of the plurality of guitar pick retainers includes a similar arcuate retainer groove that corresponds to an arcuate wall protrusion on the dispenser body.

9. The guitar pick dispenser of claim 1, wherein:

each guitar pick retainer includes a recess defined in the guitar pick retainer configured to be located between the guitar pick retainer and the dispenser body to allow for a single one of the guitar picks to pass therethrough.

10. The guitar pick of claim 9, wherein:

each guitar pick retainer includes a recess of a different size such that each guitar pick retainer corresponds to the guitar picks of a respective thickness.

11. The guitar pick dispenser of claim 9, wherein:

each guitar pick retainer includes a visual indication of a corresponding guitar pick trait that includes the thickness of a type of the corresponding guitar picks.

12. A guitar pick dispenser for holding guitar picks, the guitar pick dispenser comprising:

a dispenser body including a bottom and a side wall attached thereto, the sidewall defining an opening opposite the bottom;

a false bottom connected to the bottom by a resilient member, the resilient member configured to bias the false bottom toward the opening; and a guitar pick retainer slidably disposed on the dispenser body, the guitar pick retainer configured to partially cover the opening, wherein there are a plurality of guitar pick retainers provided, each guitar pick retainer configured to correspond to a respective type of guitar pick, wherein each guitar pick retainer includes a recess defined in the guitar pick retainer configured to be located between the guitar pick retainer and the dispenser body to allow for a single one of the guitar picks to pass therethrough, wherein each guitar pick retainer includes a recess of a different size such that each guitar pick retainer corresponds to the guitar picks of a respective thickness.

13. The guitar pick dispenser of claim 12, further comprising:

a mounting clip disposed on the dispenser body, the mounting clip configured to attach the guitar pick dispenser to a mounting body.

14. The guitar pick dispenser of claim 13, wherein:

the mounting clip defines a channel having a perimeter configured to partially receive the mounting body.

15. The guitar pick dispenser of claim 14, wherein:

the perimeter of the mounting clip includes opposing resilient flanges to slidably receive the mounting body into the channel.

16. The guitar pick dispenser of claim 12, wherein: the dispenser body further comprises a window defined in the side wall, the window configured to display a level of the false bottom relative to the bottom of the dispenser body.

17. The guitar pick dispenser of claim 12, wherein: the guitar pick retainer includes an arcuate retainer groove corresponding to an arcuate wall protrusion on the dispenser body.

18. The guitar pick dispenser of claim 12, wherein: each guitar pick retainer includes a visual indication of a thickness of a type of the corresponding guitar picks.

19. The guitar pick dispenser of claim 12, wherein: each of the plurality of guitar pick retainers includes a similar arcuate retainer groove that corresponds to an arcuate wall protrusion on the dispenser body.

* * * * *